E. C. KELLY, Jr.
SEPARATOR TRAP.
APPLICATION FILED DEC. 22, 1913.

1,123,128.

Patented Dec. 29, 1914.

Witnesses:
Josephine H. Ryan
Wright Arnold

Inventor:
Edward C. Kelly Jr.
by Robert Roberts Cushman
Attorneys

UNITED STATES PATENT OFFICE.

EDWARD C. KELLY, JR., OF BOSTON, MASSACHUSETTS, ASSIGNOR TO KELLY SEPARATOR COMPANY, OF BOSTON, MASSACHUSETTS, A CORPORATION OF MASSACHUSETTS.

SEPARATOR-TRAP.

1,123,128.   Specification of Letters Patent.   Patented Dec. 29, 1914.

Application filed December 22, 1913. Serial No. 808,055.

*To all whom it may concern:*

Be it known that I, EDWARD C. KELLY, Jr., a citizen of the United States, and resident of Boston, in the county of Suffolk and State of Massachusetts, have invented new and useful Improvements in Separator-Traps, of which the following is a specification.

This invention relates to separator traps of the class shown and described in Letters Patent of the United States No. 1,085,135, granted to me on January 27, 1914, adapted to separate water from lighter liquids, such as gasolene, oils and grease, which mix more readily with water and separate therefrom more slowly than is the case with more viscous oils.

In the use of traps of this general type for the separation of water and certain other substances, notably grease, held in suspension therein, there is a tendency for the grease or other suspended matter after its entry into the trap to cool and thicken, so that it does not readily flow into the collecting chamber; and it is the principal object of this invention to provide effective means for maintaining the contents of the trap in the liquid condition in which it enters, thus insuring the ready flow into the chamber provided for its collection.

Figure 1:
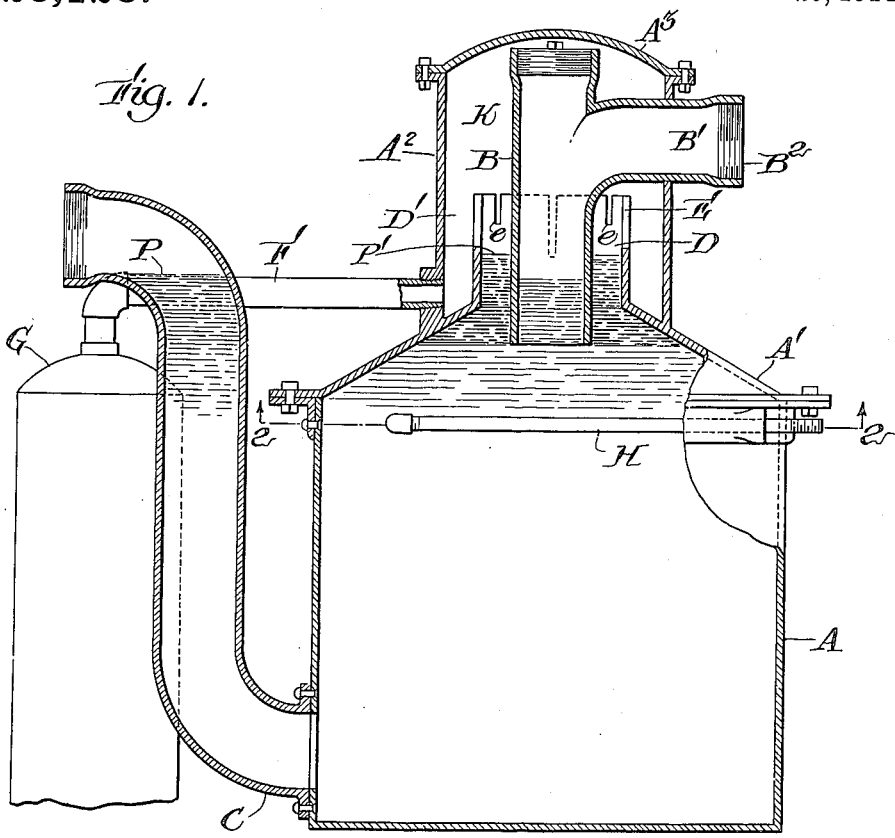
Figure 2:
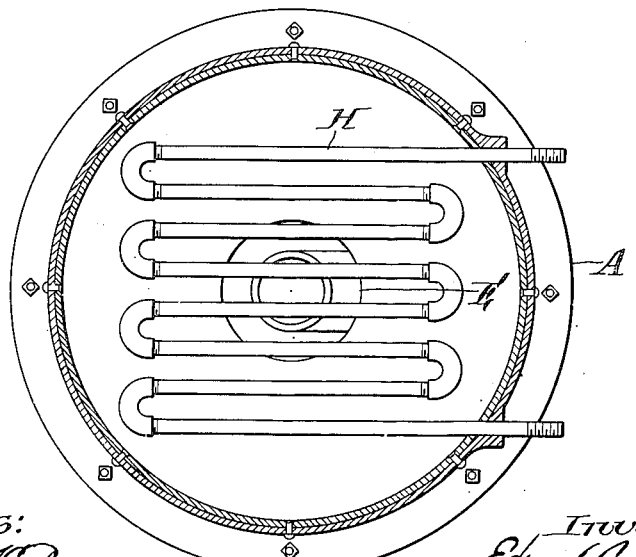

Referring to the drawings which illustrate an embodiment of my invention,—Figure 1 shows partly in section and partly in elevation, an apparatus embodying my invention; and Fig. 2 is a section on the line 2—2 of Fig. 1.

The separator trap comprises the body A, the top of which A′ is open and preferably slopes upward as shown. Upon said top A′ there is provided a casing A² having a cover A³ suitably secured thereto, forming a collecting chamber K. Within said casing A² is the receiving chamber consisting of a vertical pipe or casing B open at its lower end and extending into said trap body A to a point below the normal level of water in said tank.

The pipe or casing B is provided with an inlet pipe B′ secured at substantially a right angle thereto and extending through the wall of said casing A². Preferably the pipe or casing B and the inlet pipe B′ are formed integral as shown.

The inlet to the trap is at B² and it will be clear that as the liquids enter the pipe or casing B through the inlet pipe B′ they first impinge onto the vertical wall of the pipe or casing B, thus preventing the formation of such a downwardly directed stream as would tend to carry the oil, grease or other lighter liquids mixed with the water, through the trap body A into the outlet C.

The collecting chamber K is divided at its lower part into two portions D and D′ by a vertical partition or dam E, which extends around the pipe or casing B and is preferably formed integral with the top A′ of the trap body A. The said partition or dam E is provided with a plurality of vertical slots or outlets e, preferably of different lengths, adapted to permit the oil or other lighter liquid to flow out of said chamber D into said chamber D′. From the chamber D′ issues the oil discharge pipe F which connects with a suitable receptacle G.

Within the trap body A and passing through the side wall thereof to any suitable source of supply, is a steam pipe H preferably of the form shown in the drawings, *i. e.*, a coil having a number of sections spaced apart and lying parallel to one another in the same plane. The said pipe is horizontally disposed in said body A as shown, and is located at the top of said body so that it is adjacent to the collecting chamber D and the mouth of the pipe B and lies between the said pipe B and the outlet pipe C.

When a quantity of water having oil or grease mixed therewith enters the receiving chamber through the inlet pipe B′, it impinges upon the vertical wall of the casing B and is broken up so that there is no opportunity for the siphon action of the trap to carry the oil or grease mixed with the water through the outlet C. The oil or grease which thus enters the trap body rises and either returns to the top of the water in the casing B or is conducted by the upwardly sloping walls of the top A′ into the chamber D of the collecting chamber and into the space between that portion of the casing B which extends into the trap A and said top A′ which forms in effect an extension of the chamber D.

The levels of the liquids under normal conditions are shown at P and P′, P being the water level and P′ the grease or oil level. Upon the influx of a fresh quantity of liquid the static balance is momentarily disturbed and the liquid in chamber D rises quickly and without appreciable agitation. This rise of liquids in the chamber D will bring the level P' momentarily to or above the level of the outlets e, and a portion of the liquid will then flow through said outlets into the chamber D' and thence through the discharge pipe F into the receptacle G. The disturbance of the liquids impinged against the wall of the casing B on entering through the inlet pipe B', is such that the greater part of the grease or oil will be found in the chamber D, and there the liquids are not disturbed except to the extent of rise in response to the change of pressure; and each time a fresh supply runs into the trap in any considerable quantity, a portion of the oil or grease flows from the chamber D through the outlets e into the chamber D' and thence through the pipe F into the receptacle G.

It will, I believe, be clear that the heat from the steam pipe H will retain in its liquid form grease or the like which has gathered in the collecting chamber, so that it will readily flow into the chamber D' upon the momentary disturbance of the static balance as above described. It will also be clear that as the said pipe is located at the top of the body A and adjacent to the collecting chamber the grease in said chamber and at the top of the body is maintained in liquid condition with a minimum of heat, and it is unnecessary to heat the entire contents of the trap. Furthermore, as the pipe H is located between the pipe B and the outlet pipe C, the mixture of water and grease must pass between the parallel sections of the coil on its way to said outlet pipe, and the heat to which it is thus subjected at once liquefies all particles of grease or the like which enter the trap in solid form. Thus the heat from the pipe H forms a zone of high temperature which extends completely across the path of passage from the receiving chamber to the outlet, and serves as a screen or barrier to liquefy particles of grease or the like which enter the trap in solid form and so prevent their passage through the trap into the outlet. The importance of thus liquefying the solid particles of grease and preventing their passage into the outlet pipe C will be apparent when it is remembered that the principal use of separator traps of this type is to effect the separation of the great quantities of grease and the like discharged from dish washing machines and similar apparatus, and thus prevent it from entering and stopping up the drain or sewer pipes. Obviously to accomplish its intended purpose the traps of this type must effect a very complete separation, and if solid particles of grease were permitted to pass through the trap into the sewer pipe the utility of the device would be greatly lessened if not indeed destroyed.

I claim:—

1. A separator trap comprising a trap body having a water outlet adjacent the bottom thereof, and an oil outlet at the top of same, said body having an inlet at the top thereof and immediately adjacent said oil outlet, a heating coil arranged at the top of said body and immediately adjacent said inlet and oil outlet at which point the oil to be separated passes directly to said oil outlet entirely free from contact with the water flowing in the opposite direction.

2. In a separating trap the combination with a body having a water outlet adjacent the bottom thereof, an inlet casing at the top of said body extending laterally therein to slightly below the normal level of the water in said body, an oil collecting chamber about said inlet casing, and a heater coil disposed horizontally in the body at the top thereof immediately below said inlet casing and collecting chamber to separate the grease which enters the passage and to prevent its passage downward into the body of the water and through said outlet.

Signed by me at Boston, Massachusetts, this 18th day of December, 1913.

EDWARD C. KELLY, Jr.

Witnesses:
CHARLES D. WOODBERRY,
JOSEPHINE H. RYAN.